(12) United States Patent
Van Der Ark et al.

(10) Patent No.: US 7,989,014 B2
(45) Date of Patent: *Aug. 2, 2011

(54) BEVERAGES AND FOODSTUFFS RESISTANT TO LIGHT INDUCED FLAVOUR CHANGES, PROCESSES FOR MAKING THE SAME, AND COMPOSITIONS FOR IMPARTING SUCH RESISTANCE

(75) Inventors: Richard Van Der Ark, The Hague (NL); Peter Blokker, Alkmaar (NL); Louise Bolshaw, Leiden (NL); Eric Richard Brouwer, Alphen Aan de Rijn (NL); Paul Shane Hughes, Leidschendem (NL); Henk Kessels, Lagos (NG); Fred Olierook, The Hague (NL); Marcel Van Veen, Alphen Aan de Rijn (NL)

(73) Assignee: Heineken Supply Chain B.V., PH Zoeterwoude (NL)

( * ) Notice: Subject to any disclaimer, the term of this patent is extended or adjusted under 35 U.S.C. 154(b) by 1301 days.

This patent is subject to a terminal disclaimer.

(21) Appl. No.: 10/573,348

(22) PCT Filed: Sep. 29, 2004

(86) PCT No.: PCT/NL2004/000675
§ 371 (c)(1),
(2), (4) Date: Sep. 28, 2006

(87) PCT Pub. No.: WO2005/030920
PCT Pub. Date: Apr. 7, 2005

(65) Prior Publication Data
US 2007/0071850 A1  Mar. 29, 2007

(30) Foreign Application Priority Data
Sep. 29, 2003  (WO) ............... PCT/NL03/00664

(51) Int. Cl.
A23L 1/226  (2006.01)
(52) U.S. Cl. ............... 426/537; 426/634; 426/262
(58) Field of Classification Search ............ 426/262
See application file for complete search history.

(56) References Cited

U.S. PATENT DOCUMENTS

| | | | |
|---|---|---|---|
| 3,702,253 A * | 11/1972 | Winter et al. ............... 426/537 |
| 3,787,587 A | 1/1974 | Weber |
| 4,303,689 A | 12/1981 | Winter et al. |
| 4,389,421 A | 6/1983 | Palamand |
| 4,563,365 A | 1/1986 | Emberger et al. |
| 5,582,857 A | 12/1996 | Bordeleau et al. |
| 5,811,144 A | 9/1998 | Bordeleau et al. |
| 6,207,208 B1 | 3/2001 | Irwin et al. |
| 6,514,542 B2 | 2/2003 | McGarrity et al. |
| 2002/0119939 A1 * | 8/2002 | Bastin et al. ............... 514/42 |

FOREIGN PATENT DOCUMENTS

| CH | 568 024 | 10/1975 |
| EP | 0 342 244 A1 | 11/1989 |
| EP | 0 879 878 A1 | 11/1998 |
| JP | 007288 A | 3/1991 |

OTHER PUBLICATIONS

Agyei-Aye et al. "The role of the anion in the reaction of reducing sugars with ammonium salts" in Carbohydrate Research 337 (2002) p. 2273-2277.*

* cited by examiner

Primary Examiner — Keith D Hendricks
Assistant Examiner — Elizabeth Gwartney
(74) Attorney, Agent, or Firm — Abelman, Frayne & Schwab (57) ABSTRACT

One aspect of the present invention is concerned with a composition that can suitably be used as an additive in beverages and foodstuffs, which composition: i. contains at least 0.5%, preferably at least 1.0%, by weight of dry matter, of pyrazine derivatives according to formula (I): wherein $R_1$-$R_4$ independently represent hydrogen; a hydroxyhydrocarbyl residue; an ester of a hydroxyhydrocarbyl residue; or an ether of a hydroxyhydrocarbyl residue; and at least one $R_1$-$R_4$ is a hydroxyhydrocarbyl residue or an ester or an ether thereof, and ii. exhibits an absorption ratio $A_{280/560}$ of at least 80, preferably of at least 250. The invention also relates to a method of manufacturing a beverage or a foodstuff that is resistant to light induced flavour changes, said method comprising introducing into said beverage or foodstuff the aforementioned light stabilising composition and to a process for the manufacture of such a light stabilising composition.

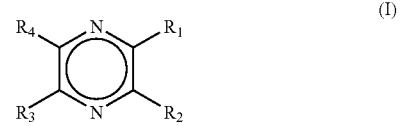

(I)

30 Claims, 6 Drawing Sheets

BEVERAGES AND FOODSTUFFS RESISTANT TO LIGHT INDUCED FLAVOUR CHANGES, PROCESSES FOR MAKING THE SAME, AND COMPOSITIONS FOR IMPARTING SUCH RESISTANCE

TECHNICAL FIELD OF THE INVENTION

The present invention relates to beverages and foodstuffs having heightened resistance to light induced flavour changes and compositions that can be used advantageously as an additive in beverages or foodstuffs to prevent or reduce light induced flavour changes. The present invention is particularly suitable for use in beverages or foodstuffs that are prone to developing an off-flavour as a result of exposure to light, and especially in such beverages or foodstuffs that are not adequately protected from the detrimental impact of light by their packaging.

The present invention also includes processes for the manufacture of such compositions from a caramelised feedstock, and processes for making the improved beverages and foodstuffs, using the compositions according o the invention.

BACKGROUND OF THE INVENTION

Light induced off-flavour formation is a well known problem in the beverage and food industry. A variety of off-flavour generating reactions that are incited or accelerated by exposure to light have been described in the scientific literature. The rate at which these off-flavour generating reactions progress is usually increased dramatically by exposure to light with a wavelength below 500 nm, particularly UV-light.

Light sensitive flavour changes in beverages and foodstuffs may be inhibited effectively by packaging these beverages or foodstuffs in a material that will not transmit light frequencies that promote off-flavour generating reactions. However, for a variety of reasons it is sometimes desirable to employ a packaging material that does not exhibit this light shielding quality. In those cases, the composition of the beverage or foodstuff will need to be optimised to achieve sufficient stability against light induced flavour changes. Where this cannot be achieved with the usual constituents of such beverages or foodstuffs, special light stabilising additives may be used.

It is known in the art to employ a large variety of additives for the stabilisation of beverages and food products against light induced off-flavour formation. Many of these additives derive their effectiveness from their capability to inhibit off-flavour generating reactions, e.g. by scavenging of one or more of the reactants and/or key intermediates. In addition, additives have been proposed that scavenge the off-flavour causing reaction products (e.g. by forming a non-volatile complex) or that promote degradation of these reaction products to less flavour active products.

Instead of minimising the impact of light induced off-flavour generating reactions as described above, it is also possible to prevent these reactions from occurring by introducing an additive that neutralises the undesired impact of said light and particularly the ultraviolet component of said light. U.S. Pat. No. 5,948,458 describes a method for the prevention of spoilage, rancidity or off-color in a liquid food product containing unsaturated lipids and fats caused by exposure of the liquid food product to ultraviolet light comprising the step of adding to said food product an ultraviolet absorbing effective amount of tricalcium phosphate.

U.S. Pat. No. 4,389,421 teaches the addition of organic compounds containing 1,8-epoxy groups, such as 1,8-cineole, to prevent or significantly reduce light struck flavour in malt beverages. It is hypothesised therein that the addition of 1,8-epoxy compounds to malt beverages prevents the formation of methyl butenyl mercaptan by preventing cleavage of a five carbon fragment (iso-pentenyl chain) from the iso-hexenoyl side chain of iso-α-acids, which fragments would otherwise react with the sulfhydryl group forming the iso-pentenyl mercaptan (methyl butenyl mercaptan). It is stated that the 1,8-epoxy compounds may prevent formation of methyl butenyl mercaptan by reacting with the iso-pentenyl fragment or by protecting the iso-hexenoyl side chain from fragmenting or by blocking the sulfhydryl group from reacting with the iso-pentenyl fragment.

Many food additives that have been proposed for stabilising beverages or foodstuffs against light induced off-flavour formation have to be labelled as chemical entities on the product package. With a view to consumer acceptance manufacturers of beverages and foodstuffs generally do not like to use such chemical or artificial additives but, instead, prefer to employ additives that make more appealing ingredient labels (consumer-friendly labels) possible and that deliver similar functionality.

SUMMARY OF THE INVENTION

The inventors have discovered that compositions containing a substantial amount of N-heterocyclic substances can be used advantageously as additives in beverages and foodstuffs to protect these against light induced flavour changes. Although the inventors do not wish to be bound by theory, it is believed that N-heterocyclic substances are capable of absorbing ultraviolet light without being decomposed into undesirable off-flavour generating substances. Thus, N-heterocyclic substances may be used to inhibit decomposition or reaction of light sensitive substances as a result of UV-induced excitation. Although the inventors believe that the advantageous properties of N-heterocyclic substances are mainly associated with their UV-absorbing properties, it is possible that these protective properties are partially derived from other intrinsic qualities of these substances.

N-heterocyclic substances that are particularly effective in protecting light induced flavour changes are pyrazine derivatives according to formula (I):

wherein $R_1$-$R_4$ independently represent hydrogen; a hydroxyhydrocarbyl residue; an ester of a hydroxyhydrocarbyl residue; or an ether of a hydroxyhydrocarbyl residue; and at least one of $R_1$-$R_4$ is a hydroxyhydrocarbyl residue or an ester or an ether thereof. More preferably, at least one of $R_1$-$R_4$ represents a hydroxyhydrocarbyl residue or an ester thereof, most preferably it represents a hydroxyhydrocarbyl residue.

The inventors have also discovered that N-heterocyclic substances may suitably be obtained by caramelisation of a sugar feedstock in the presence of a nitrogen source. Furthermore, they have found that the dark colour that is characteristic of caramelised feedstock, and which is unwanted in certain applications, can be removed without adversely affecting the advantageous properties associated with the presence of N-heterocyclic substances. The use of a caramelised feedstock as a source of N-heterocyclic substances offers the advantage that the present composition may be referred to on product packaging ingredient lists by a consumer-friendly term, e.g. "caramel", "caramel colour", "caramel extract" or "caramel isolate".

Commercially available caramels that have been produced by caramelisation in the presence of a nitrogen source are commonly characterised on the basis of the so called extinction ratio (the absorption ratio $A_{280/560}$) which is determined by the method described below under "Classification/Absorbance ratio". Typically, these caramels exhibit an absorption ratio $A_{280/560}$ of less than 120. Decolourisation of a caramelised feedstock in accordance with the present invention removes coloured components that absorb at around 560 nm whilst at the same time retaining the UV-absorption characteristics attributed to the N-heterocyclic substances. Thus, decolourisation of caramelised feedstock in accordance with the invention produces a material with a significantly higher absorption ratio $A_{280/560}$ than ordinary caramels that have been produced by caramelisation in the presence of a nitrogen source (notably ammonia caramel and sulphite ammonia caramel).

DETAILED DESCRIPTION OF THE INVENTION

Accordingly, one aspect of the present invention is concerned with a method of manufacturing a hop containing beverage that is resistant to light induced flavour changes, said method comprising introducing into said beverage a light stabilising composition containing at least 0.5%, preferably at least 1.0%, more preferably at least 3.0% by weight of dry matter, of N-heterocyclic substances; and wherein the light stabilising composition, if it contains a significant amount of caramelised material, exhibits an absorption ratio $A_{280/560}$ of at least 80, preferably of at least 250. Here a significant amount means an amount sufficient to detectably improve the light stability of the beverage or foodstuff.

The term "wavelength" as used in here, refers to a wavelength of light, unless indicated otherwise. Whenever reference is made in here to "absorption", unless indicated otherwise, this refers to absorption of light.

It was found that N-heterocyclic substances of which the ring(s) contains at least two nitrogen atoms exhibit particularly good light stabilising properties. Aromatic N-heterocyclic substances, particularly those containing two nitrogen atoms, are particularly preferred. Preferably, the N-heterocyclic substances are selected from the group consisting of pyrazines, pyrimidines, pyridazines, and combinations thereof. The present invention encompasses the introduction into beverages or foodstuffs of both synthetic (artificial) and natural N-heterocyclic substances, the latter being most preferred. Here the term "natural" is used to indicate that such a pyrazine derivative is obtained from a natural source, i.e. it is not obtained by reaction of (petro)chemicals.

The N-heterocyclic substances according to the present invention preferably exhibit a water solubility of at least 10 mg/kg, more preferably of at least 100 mg/kg. The molecular weight of said substances typically does not exceed 500, preferably it does not exceed 400, more preferably it does not exceed 350.

In a particularly preferred embodiment of the invention the N-heterocyclic substances employed are pyrazine derivatives according to formula (I):

wherein $R_1$-$R_4$ independently represent hydrogen; a hydroxyhydrocarbyl residue; an ester of a hydroxyhydrocarbyl residue; or an ether of a hydroxyhydrocarbyl residue; and at least one of $R_1$-$R_4$ is a hydroxyhydrocarbyl residue or an ester or an ether thereof. More preferably, at least one of $R_1$-$R_4$ represents a hydroxyhydrocarbyl residue or an ester thereof, most preferably it represents a hydroxyhydrocarbyl residue.

Another aspect of the invention a method of manufacturing a beverage or a foodstuff that is resistant to light induced flavour changes, said method comprising introducing into said beverage or foodstuff a light stabilising composition containing at least 0.5% by weight, preferably at least 1.0%, by weight of dry matter, of pyrazine derivatives according to formula (I) and wherein the light stabilising composition, if it contains caramelised material, exhibits an absorption ratio $A_{280/560}$ of at least 80, preferably of at least 250.

The present invention encompasses all stereoisomers that can be represented by the formulas presented herein. Thus, the present invention may employ racemic mixtures of the present N-heterocyclic substances as well as essentially pure enantiomers of said substances.

In a particularly preferred embodiment, at least two of $R_1$-$R_4$ is a hydroxyhydrocarbyl residue or an ester or an ether thereof. In case the pyrazine derivative contains two hydroxyhydrocarbyl residues, it is preferred that these residues are in the para or meta positions. Most preferably, in the present pyrazine derivatives two of $R_1$-$R_4$ are a hydroxyhydrocarbyl residue or an ester or an ether thereof The term "hydroxyhydrocarbyl" as used herein refers to hydroxyl substituted hydrocarbyls. The term "hydrocarbyl" refers to branched and linear hydrocarbon chains, optionally containing one or more unsaturated carbon-carbon bonds, i.e. carbon-carbon double bonds and carbon-carbon triple bonds, said hydrocarbon atoms preferably having 1-20 carbon atoms. Typical examples of hydroxyhydrocarbyls include branched as well as unbranched hydroxyalkyls and hydroxyalkenyls. In addition to hydroxyl substituents, the hydrocarbyl residue may also comprise other substituents such as carbonyl, carboxyl, acyl, amino, acylamino, alkoxy, hydroxyamino, alkoxyamino, thiol, disulfide, ether, ester, alkylthio and amide, groups. Preferably, the latter substituents contain not more than 10, more preferably not more than 5 carbon atoms. Most preferably, the hydrocarbyl residue does not contain substituents other than one or more hydroxyl groups.

Typically, the hydroxyhydrocarbyl residue comprises 1-10, preferably 2-4 carbon atoms, and more preferably 3 or 4 carbon atoms. In a particularly preferred embodiment, the total number of carbon atoms present in the pyrazine derivatives is within the range of 5-12, more preferably within the range of 9-12.

The at least one hydroxyhydrocarbyl residue preferably comprises at least two hydroxyl groups. More preferably, said residue comprises three or four hydroxyl groups.

The pyrazine derivatives in the light stabilising composition of the present invention typically contain a high fraction of di-substituted pyrazines. Hence, in a preferred embodiment, the present composition contains at least 0.5% by weight of dry matter of pyrazine derivatives according to formula (I), wherein at least two of $R_1$-$R_4$ independently represent a hydroxyhydrocarbyl residue or an ester or an ether thereof.

Examples of di-substituted pyrazine derivatives that are particularly abundant in the present composition include fructosazines, particularly 2,5- and 2,6-substituted fructosazines. Hence, in a preferred embodiment, the present composition contains at least 0.1%, more preferably at least 0.3%, even more preferably at least 0.5% and most preferably at least 1.0% of a fructosazine selected from the group consisting of 2,5-deoxyfructosazine (1-[5-(2,3,4-trihydroxybutyl)-pyrazin-2-yl]-butane-1,2,3,4-tetraol), 2,6-deoxyfructosazine (1-[6-(2,3,4-trihydroxybutyl)-pyrazin-2-yl]-butane-1,2,3,4-tetraol), 2,5-fructosazine (1-[5-(1,2,3,4-tetrahydroxybutyl)-pyrazin-2-yl]-butane-1,2,3,4-tetraol), 2,6-fructosazine (1-[6-(1,2,3,4-tetrahydroxybutyl)-pyrazin-2-yl]-butane-1,2,3,4-tetraol) and combinations thereof, by weight of dry matter. In an especially preferred embodiment, the fructosazine is selected from the group consisting of 2,5-deoxyfructosazine, 2,6-deoxyfructosazine and combinations thereof. Most preferably, the fructosazine is selected from the group consisting of 1-[6-(2,3,4-trihydroxybutyl)-pyrazin-2-yl]-butane-1,2,3,4-tetraol, 1-[5-(2,3,4-trihydroxybutyl)-pyrazin-2-yl]-butane-1,2,3,4-tetraol and combinations thereof. The latter deoxyfructosazines are represented by the following formulae:

1-[6-(2,3,4-trihydroxybutyl)-pyrazin-2-yl]-butane-1,2,3,4-tetraol (2,6-deoxyfructosazine)

1-[5-(2,3,4-trihydroxybutyl)-pyrazin-2-yl]-butane-1,2,3,4tetraol (2,5-deoxyfructosazine)

An important characteristic of the light stabilising composition according to the invention is its relatively high absorption of UV light in the range of 250-400 nm and especially in the range of 250-350 nm. The absorbance at 280 nm, i.e. $A_{280}$, is a good measure for this particular quality. Typically, the present composition exhibits an $A_{280}$ that exceeds 0.01, preferably exceeds 0.05, more preferably exceeds 0.1 and most preferably exceeds 0.3. The $A_{280}$ is determined relative to % solids as described herein below under "Colour intensity", except that the absorbance is measured at 280 nm instead of 610 nm.

As mentioned herein before N-heterocyclic substances may suitably be obtained by caramelisation of a sugar feedstock in the presence of a nitrogen source. Caramelisation is commonly defined as the thermal degradation of sugars leading to the formation of volatiles (caramel aroma) and brown-coloured products (caramel colours). The process is acid or base catalysed and generally requires temperature in excess of 120° C. at a pH within the range of 3 and 9. The generation of flavours and colours in thermally induced caramelisation requires that sugars, normally monosaccharides, first undergo intramolecular rearrangements. Usually, the reaction causes the release of $H^+$. Thus, the pH of a solution undergoing caramelisation falls with time.

The inventors have developed a method for the manufacture of the present light stabilising composition from a caramelised feedstock wherein the typical caramel colour is largely removed. For many applications it is desirable that the light stabilising composition, at the dosage level at which it is applied in a beverage or foodstuff, does not impart significant colour. A decolourised caramelised feedstock can be used advantageously to stabilise beverages or foodstuffs against light induced flavour changes without introducing a substantial colour change. Thus, in a preferred embodiment, the present light stabilising composition is derived from a caramelised feedstock and combines a relatively high absorption of UV light, particularly at wavelengths in the range of 250 to 400 nm, with a relatively low absorption of visible light, as demonstrated by a ratio of the light absorption at wavelengths 280 nm and 560 nm ($A_{280/560}$) of at least 80, preferably of at least 250.

Typically, the present light stabilising composition is introduced into the beverage or foodstuff in an amount of at least 0.01 wt. %, preferably of at least 0.02 wt. % and more preferably of at least 0.03 wt. %, calculated on the basis of the amount of dry matter introduced. Typically the amount introduced will not exceed 1 wt. %, preferably it will not exceed 0.5 wt. %, more preferably it will not exceed 0.3 wt. %, again calculated on the basis of the amount of dry matter introduced.

The present composition is particularly suitable for preventing light induced flavour changes in beverages and foodstuffs that contain significant quantities of riboflavin, which substance can act as a photo-initiator. The composition is particularly advantageously used in beverages and foodstuffs that contain at least 10 μg/kg (ppb) riboflavin, more preferably at least 50 μg/kg riboflavin and most preferably at least 100 μg/kg riboflavin.

As mentioned herein before, the light stabilising composition according to the invention advantageously contains substantial amounts of pyrazine derivatives. Typically, the present composition is introduced into beverages or foodstuffs in such an amount that the resulting product contains at least 0.5 mg/kg preferably at least 1 mg/kg, more preferably at least 3 mg/kg and most preferably at least 10 mg/kg of the pyrazine derivatives as defined herein before. In an even more preferred embodiment, the malt beverage contains at least 0.5 mg/kg, preferably at least 1 mg/kg of a fructosazine selected from the group consisting of 2,5-deoxyfructosazine, 2,6-deoxyfructosazine, 2,5-fructosazine, 2,6-fructosazine and combinations thereof.

The benefits of the present light stabilising composition are particularly pronounced if said composition is used to stabilise bottled beverages. The term "bottled beverage" encompasses beverages in glass containers (e.g. bottles, jars etc.) as well as beverages in light-transparent plastics, such as plastics based on polyethylene (e.g. polyethylene (PE), polyethylene teraphtalate (PET) and/or polyethylene naphthalate PEN)); polycarbonate; PVC; and/or polypropylene. In a particularly preferred embodiment, the present light stabilising composition is used as an additive, particularly a light stabilising additive, in beverages bottled in green, clear (e.g. flint) or blue glass. Most preferably, it is used as an additive in beverages bottled in green or clear glass.

The present invention encompasses the use of the light stabilising composition in a wide variety of beverages, including beer, soft drinks, liquor, juices, dairy drinks etc. In a particularly preferred embodiment, the composition is used to prevent or reduce light induced flavour changes in malt beverages, such as beer, ale, malt liquor, porter, shandy, and others which are made from or contain fermented extracts of malt. The present light stabilising composition is particularly advantageously employed to improve light stability of beer, more preferably of relatively pale beer, e.g. beer with an EBC colour value of less than 25, more preferably of less than 15, most preferably of less than 12. A suitable method for determining the EBC colour value is described below.

It is well known in the brewing industry that exposure of brewed beverages, such as lager, ale, porter, stout and the like (herein generically referred to as "beer"), to sunlight or artificial light, has a detrimental effect on the sensory quality of these beverages. To be more precise, exposure to light is known to cause the development of the so-called "skunky" flavour, which is sometimes also referred to as "sunstruck" or "light struck" flavour. In general sunstruck formation in beer is promoted particularly strongly by light with a wavelength of 250-550 nm. In general it can be said, the shorter the wavelength the higher the rate at which sunstruck flavour is formed.

It is believed that volatile sulphur-containing compounds are responsible for the sunstruck flavour. These sulphur-containing compounds are thought to be formed at least in part by reaction of other sulphur-containing compounds with photochemically degraded hop components in the beverage. Extremely small quantities of these sulphur compounds are sufficient to impart a sunstruck flavour to a beverage and to render it less acceptable for the consumer (cf. for example Kirk-Othmer, Encyclopedia of Chemical Technology, 4$^{th}$ Ed., Vol. 4, pages 22-63, 1992 and U.S. Patent Application No. 2002/0106422).

The photochemical reaction leading to the sulphur-containing substances that cause sunstruck flavour, is believed to be assisted by the presence of riboflavin. Riboflavin can act as a photo initiator in a beverage and is present in beer in significant quantities. Riboflavin in beer emanates mainly from the malt used therein. To a lesser extent also hops and the action of yeast during the fermentation can contribute to the riboflavin content of beer (cf. for example "Kinetics of Riboflavin Production by Brewers Yeast" by Tamer et al., pages 754-756 Enzyme Microb. Technology, 1988, Vol. 10, December).

In order to solve the sunstruck problem it has been proposed to reduce the amount of riboflavin in the beer ("Sunstruck Flavour Formation in Beer" by Sakuma et al. ASBC Journal). Removal of riboflavin can be accomplished by decomposition. e.g. by using actinic radiation (U.S. Pat. No. 3,787,587, U.S. Pat. No. 5,582,857 and U.S. Pat. No. 5,811,144). The amount of riboflavin present in the beer may also be reduced by treating the beer with absorbent clay (U.S. Pat. No. 6,207,208) or by co-fermenting with a combination of yeast and *Leuconostoc mesenteroides* (U.S. Pat. No. 6,514,542). It has also been suggested to use immobilised riboflavin-binding protein to remove riboflavin or to add said protein to a beverage to inactivate riboflavin (EP-A 0 879 878).

The present light stabilising composition is particularly effective in preventing the development of sunstruck flavour in beer, especially in beer that is stored in a container that is transparent to light, particularly a container that is transparent to light with a wavelength in the range of 330-360 nm, more particularly a container that is transparent to a wider spectrum of light within the range of 320-400 nm.

A principal source of the sunstruck flavour in beer is 3-methyl-2-butene-1-thiol (3-MBT). The sensory threshold value for this substance in water is only a few ng/kg (ppt). 3-MBT is believed to be formed by the reaction between light excited riboflavin (largely originating from the malt component) and the bittering principles in beer, the iso-α-acids, which originate mainly from hop. The use of the present light stabilising composition in an effective amount to inhibit light induced flavour changes is evident by a reduction in the rate of 3-MBT formation by at least 30%, preferably by at least 50%, more preferably by at least 60%, even more preferably by at least 70% and most preferably by at least 80%. A suitable method for determining the reduction in MBT formation is described in the Examples.

Another aspect of the invention relates to a composition that can suitably be used as an additive in beverages and foodstuffs, which composition:

i. contains at least 0.5%, preferably at least 1.0%, by weight of dry matter, of pyrazine derivatives as defined herein before; and ii. exhibits an absorption ratio A280/560 of at least 80, preferably of at least 200, more preferably of at least 250, more preferably of at least 350, more preferably of at least 400, even more preferably of at least 500 and most preferably of at least 1000.

Since the present composition must be suitable for use in beverages and foodstuffs, said composition should not include appreciable amounts of non-food grade organic solvents such as those commonly used to dissolve chemicals. Thus, the present invention does not encompass solutions of pyrazine derivates in such non-food grade organic solvents.

In order to facilitate the dosing and dispersing of the present composition, the present composition contains not more than 70%, preferably not more than 60% and more preferably not more than 50% of the aforementioned 2,5-deoxyfructosazine, 2,6-deoxyfructosazine, 2,5-fructosazine, 2,6-fructosazine. In an even more preferred embodiment, the present composition contains not more than 70%, more preferably not more than 60% and most preferably not more than 50% of the pyrazine derivatives as defined herein before. The remainder of the composition may suitably consist of edible dry carrier materials, water, ethanol, lipids or any combinations thereof.

In a particularly preferred embodiment, the present composition is derived from a caramelised feedstock, e.g. by decolourising such a feedstock, whilst maintaining its UV absorption characteristics, so as to increase the $A_{280/560}$ absorption ratio. The present light stabilising composition, when based on a caramelised feedstock obtained by caramelising sugars in the presence of a nitrogen source, will usually contain a significant amount of aminosugars such as glucosamine and fructosamine. More particularly, the composition will typically contain at least 0.001%, preferably at least 0.01%, more preferably at least 0.03%, most preferably at least 0.05% aminosugars, particularly aminosugars comprising mono- or disaccharide residues, more particularly aminosugars comprising a monosaccharide residue. The latter percentages being calculated as % by weight on dry matter of the composition.

The present composition is suitable for stabilising a wide variety of beverages and food products against light induced flavour changes. Best results, however, are obtained in water containing food products, particularly water-continuous food products. In order to avoid that the use of the present composition in these products will cause precipitation, it is preferred that the present stabilising composition is essentially completely water soluble. Preferably, the present composition is essentially completely water soluble up to a dry solids content of at least 0.01 wt. %, more preferably up to a dry solids content of at least 0.05 wt. %, most preferably up to 0.1 wt. %.

The present light stabilising composition preferably contains not more than minor amounts of the melanoidins that are largely responsible for the brown colour of caramelised materials. Melanoidins are relatively large molecules that can suitably be removed after completion of the caramelisation reaction by means of filtration or another separation technique that enables separation on the basis of molecular weight, size, hydrophobicity or charge. The resulting composition typically contains less than 30%, preferably less than 20%, more preferably less than 15%, even more preferably less than 10% and most preferably less than 5%, by weight of dry matter, of components having a molecular weight in excess of 30 kDa. More particularly, the aforementioned amounts relate to the components having a molecular weight in excess of 10 kDa, even more particularly in excess of 5 kDa and most particularly in excess of 1 kDa. The amount of components with a molecular weight in excess of 30 kDa contained in the present composition is determined by passing an aqueous solution of said composition over a Millipore® YM30 filter. Millipore® YM10 and YM1 filters may be used to determine contents of components with a molecular weight in excess of 10 kDa and 1 kDa respectively. It is noted that different techniques for determining the content of high molecular components may yield different results. Therefore, it should be understood that the kDa numbers recited within this application are defined in relation to the methodology described above.

The reduced level of melanoidins and other colour contributing substances is also evident by a low colour intensity, particularly at wavelengths around 600 nm. In a particularly preferred embodiment of the invention, the present light stabilising composition has a colour intensity at 610 nm that does not exceed 0.024, preferably does not exceed 0.01 as calculated herein. Even more preferably, said colour intensity does not exceed 0.003 as calculated herein. A suitable method for determining the colour intensity at 610 nm is described below.

The present composition is advantageously provided in a relatively concentrated form, e.g. with a solids content of at least 10 wt. %. More preferably, the solids content is at least 20 wt. %, most preferably at least 30 wt. %. The present composition may take the form of a liquid, a syrup, a paste, a powder, granules or tablets. Preferably, the present composition contains less than 80 wt. %, more preferably less than 70 wt. % water.

Preferably, the amount of nitrogen substances in the present lights stabilising composition is limited. Consequently, in a preferred embodiment, the total nitrogen content of the present composition, as determined by Nitrogen Determination (Kjeldahl Method), Method II (FNP 5), is less than 20%, more preferably less than 15%, most preferably less than 10% by weight of dry matter. In another preferred embodiment, said nitrogen content is at least 0.1%, more preferably at least 0.2% by weight of dry matter.

The light stabilising composition according to the invention may suitably include additives such as anti-oxidants, emulsifiers and carrier materials. Preferably, however, the present composition does not contain any ingredients that are not considered "natural", i.e. that need to be labelled as "artificial", "synthetic" or "chemical". In a particularly preferred embodiment the entire present composition is derived from caramel, so that it can be labelled as "caramel", "caramel colour", "caramel isolate", "caramel extract" or the like.

Yet another aspect of the present invention relates to a process for the manufacture of a composition that may suitably be used as an additive to improve the stability of beverages or foodstuffs against light induced flavour changes, said process comprising the steps of:

providing a caramelised feedstock;
decolourising said feedstock so as to increase its $A_{280/560}$ by at least 100%.

Decolourisation of the caramelised feedstock may be achieved by any technique known in the art that enables the selective isolation from said feedstock of a light stabilising composition as defined herein before, or that enables selective elimination of the colouring substances present in the caramelised feedstock, e.g. by bleaching. Examples of suitable isolation techniques include: treatment with an adsorbent material (e.g. reversed phase sorbents), filtration and chromatography. In one embodiment of the present process the decolourising is achieved by filtration over one or more filters with a cut-off of not more than 30 kDa, preferably of not more than 10 kDa, more preferably of not more than 5 kDa and most preferably of not more than 1 kDa. In another embodiment, decolourisation is achieved by adsorption of the colouring substances onto a reversed phase sorbent, particularly an alkyl-bonded silica or onto cation exchange resin. In yet another embodiment, decolourising is achieved by means of liquid chromatography, preferably by means of reversed phase or cation exchange chromatography.

Following caramelisation, the caramelised feedstock may comprise high molecular products that are hardly soluble in aqueous systems. When used as such in beverages or foodstuffs that are translucent by nature, this may give rise to an undesirable haze or cloudiness. Thus, in a preferred embodiment, the present process yields a composition that is essentially completely water soluble, meaning that said process comprises an additional step of removing and/or solubilising insoluble matter if this is required to achieve said water solubility. The insoluble matter may suitably be solubilised by e.g. sonication or by adding solvent.

In the present process, the optional removal or solubilisation of insoluble matter is preferably carried out prior to decolourisation. It is noted that the present invention also encompasses a process wherein decolourisation and removal of insolubles are achieved in a single step, e.g. by filtration.

The present invention also encompasses a process wherein the caramelised feedstock contains a caramel source in combination with one or more other brewing adjuncts, e.g. malt, malted barley, syrup. A particularly suitable caramel source for the present process is caramel, particularly a caramel as defined in the European Union Directive 95/45; Purity Criteria concerning Colours for use in Foodstuffs or as defined in US Food Chemical Codex IV. Accordingly, in a very preferred embodiment, the caramelised feedstock contains at least 50% by weight of dry matter of brewing adjuncts, including at least 5% caramel by weight of dry matter. More preferably, the feedstock contains at least 10%, even more preferably at least 30% and most preferably at least 50% caramel by weight of dry matter.

Caramel is a complex mixture of compounds, some of which are in the form of colloidal aggregates. Caramel is manufactured by heating carbohydrates either alone or in the presence of food-grade acids, bases, and/or salts. Caramel is usually a dark brown to black liquid or solid having an odour of burnt sugar and a somewhat bitter taste. Caramel is produced from commercially available food-grade nutritive sweeteners including fructose, dextrose (glucose), invert sugar, sucrose, lactose, molasses and/or starch hydrolysates and fractions thereof. The acids that may be used are food-grade sulphuric, sulphurous, phosphoric, acetic and citric acids, and suitable bases are ammonium, sodium, potassium and calcium hydroxides. Salts that may be used include ammonium, sodium and potassium carbonate, bicarbonate, phosphate (including mono- and dibasic), sulphate, and sulphite. Caramel is soluble in water.

Four distinct classes of caramel can be distinguished by the reactants used in their manufacture and by specific identification tests (see European Union Directive 95/45 Purity Criteria concerning Colours for use in Foodstuffs and the US Food Chemical Codex IV):

- Class I: plain caramel, caustic caramel; E 150a. Class I caramels are prepared by heating carbohydrates with or without acids, bases or salts, but in the absence of ammonium or sulphite compounds.
- Class II: caustic sulphite caramel; E 150b. Class II caramels are prepared by heating carbohydrates with or without acids or bases in the presence of sulphite compounds, but in the absence of ammonium compounds.
- Class III: ammonia caramel; E 150c. Class III caramels are prepared by heating carbohydrates with or without acids or bases in the presence of ammonium compounds, but in the absence of sulphite compounds.
- Class IV: sulphite ammonia caramel; E 150d. Class IV caramels are prepared by heating carbohydrates with or without acids or bases in the presence of both sulphite as well as ammonia compounds.

Ammonium compounds that are used in class III and IV caramels include ammonium hydroxide, ammonium carbonate, ammonium hydrogen carbonate, ammonium phosphate, ammonium sulphate, ammonium sulphite and ammonium hydrogen sulphite. The sulphite compounds are for example sulphurous acid, potassium, sodium and ammonium sulphites and potassium, sodium, ammonium hydrogen sulphites. During the preparation process, food-grade anti-foaming agents may be used as processing aids.

Of the aforementioned four classes of caramel, ammonia caramel and ammonia sulphite caramel are particularly suitable starting material for the present process. In particular ammonia caramel (class III) constitutes an excellent starting material for the production of a light stabilising composition according to the invention.

The decolourisation step employed in accordance with this invention does not result in a significant removal or elimination of substances that inhibit sunstruck formation, but merely removes or eliminates substances that absorb in the visible area. Thus, the decolourisation largely preserves the absorption characteristics of the decolourised material at those wavelengths associated with light induced off-flavour formation. This preservation of, mostly UV-light blocking compounds is best expressed by the 280/560 ratio ($A_{280/560}$). This ratio is used in the European caramel purity guidelines (95/45/EU) and denoted as the extinction ratio. Ammonium sulphite caramel is specified having an $A_{280/560}$ of less than 50. Although, there are no such specifications set for ammonia caramel, in general it will have an $A_{280/560}$ of less than 80, more specifically of less than 50. The decolourised caramelised feedstock obtained from the present process typically has an $A_{280/560}$ of more than 80, preferably of more than 200, more preferably of more than 250, more preferably of more than 350, more preferably of more than 400, even more preferably of more than 500 and most preferably of more than 1000.

According to the earlier mentioned EU regulations caramel must have a colour intensity (at 610 nm) of 0.01-0.6. For ammonia caramel the requirement is that the colour intensity is within the range of 0.08-0.36. A description of a method for determining the colour intensity is provided below. The colour intensity of the caramelised feedstock used in the present process preferably exceeds 0.01, more preferably exceeds 0.024 on a dry weight basis. In the present process, the colour intensity of the caramelised feedstock is preferably reduced by at least a factor 5, more preferably by at least a factor 10 and most preferably by at least a factor 20 as a result of the decolourisation.

The present process will usually produce a considerable yield in the form of the present light stabilising composition. Typically, the yield of the present process is in the range of 5-90%, especially in the range of 10-80%. In a particularly preferred embodiment the present process yields a light stabilising composition in accordance with the present invention in a yield of at least 20%.

Another aspect of the invention is concerned with a beverage or foodstuff that is resistant to light induced flavour changes, wherein the beverage or foodstuff is obtained or obtainable by a method of manufacture that comprises introducing the present light stabilising composition into said beverage or foodstuff.

In particular, the invention relates to such a beverage or foodstuff that contains at least 0.5 mg/kg preferably at least 1 mg/kg, more preferably at least 3 mg/kg and most preferably at least 10 mg/kg of pyrazine derivatives as defined herein before. In an even more preferred embodiment the beverage or foodstuff obtainable by the present method contains at least 0.5 mg/kg, preferably at least 1 mg/kg of a fructosazine selected from the group consisting of 2,5-deoxyfructosazine, 2,6-deoxyfructosazine, 2,5-fructosazine, 2,6-fructosazine and combinations thereof.

Yet another aspect of the invention relates to a hop containing beverage that is resistant to light induced flavour changes, said hop containing beverage containing pyrazine derivatives as defined herein before and exhibiting an EBC colour value of less than 25, preferably of less than 15, more preferably of less than 12, wherein the content of the pyrazine derivatives, expressed in mg/kg, exceeds 0.1×EBC colour value, more preferably exceeds 1×EBC colour value. Even more preferably, said content exceeds 5×EBC colour value, most preferably 10×EBC colour value.

In a particularly preferred embodiment, the hop containing beverage contains at least 0.5 mg/kg, preferably at least 1 mg/kg of a fructosazine selected from the group consisting of 2,5-deoxyfructosazine, 2,6-deoxyfructosazine, 2,5-fructosazine, 2,6-fructosazine and combinations thereof.

The hop containing beverage according to the invention preferably contains at least 0.5 mg/kg, more preferably at least 1 mg/kg, even more preferably at least 3 mg/kg and most preferably at least 10 mg/kg of the pyrazine derivatives as defined herein before.

Preferably, the hop containing beverage is a fermented cereal based beverage. More preferably, the hop containing beverage is beer, malt liquor, porter, shandy, or another beverage made from or containing fermented extracts of malt. Even more preferably, the beverage is beer, most preferably lager beer. In a particularly preferred embodiment, the hop containing beverage has a yellow or yellowish colour, i.e. it does not have a brownish colour associated with the use of significant amounts of colouring caramel.

As explained herein before, the benefits of the present light stabilising composition will be particularly apparent in light sensitive products that have been packaged in containers that are transparent to light with a wavelength of less than 500 nm, especially less than 400 nm, e.g. green, clear and blue glass. Consequently, in a preferred embodiment, the present hop containing beverage is bottled in green, clear or blue glass, especially in clear or green glass.

Methods

Solids Content

The solids content of a material is determined by drying a sample upon a carrier composed of pure quartz sand that passes a No. 40 but not a No. 60 sieve and has been prepared by digestion with hydrochloric acid, washed acid-free, dried and ignited. Mix 30.0 g of prepared sand accurately weighed with 1.5-2.0 g material accurately weighed and dry to constant weight at 60° C. under reduced pressure 50 mm Hg (6.7 kPa). Record the final weight of the sand plus caramel or decolourised caramel. Calculate the % solids as follows:

$$\% \text{ solids} = \frac{(w_F - w_S)}{w_C} \times 100$$

where
$w_F$=final weight of sand plus caramel
$w_S$=weight of sand
$w_C$=weight of caramel initially added Colour Intensity For the purpose of this specification, Colour Intensity of a certain material is defined as the absorbance of an 0.1% (w/v) solution of solids in water in a 1 cm quartz cell at 610 nm. If necessary, pH of the solution is adjusted to between 4 and 7.

Procedure

Transfer an amount of material equivalent to 100 mg solids into a 100 mL volumetric flask, dilute to volume with water, mix and centrifuge if the solution is cloudy. Determine the absorbance of the clear solution in a 1 cm quartz cell at 610 nm with a suitable spectrophotometer previously standardized using water as a reference. Calculate the Colour Intensity of the material as follows:

$$\text{Colour intensity} = \frac{A_{610} \times 100}{\% \text{ solids}}$$

Determine % solids as described under Solids content.

Classification/Absorbance Ratio

For the purposes of this specification, Absorbance Ratio of a material is defined as the absorbance of an 0.1% (w/v) solution of solids in water at 280 nm divided by the absorbance of the same solution at 560 nm. If necessary, pH of the solution is adjusted to between 4 and 7.

Procedure

Transfer an amount of material equivalent to 100 mg solids into a 100-ml volumetric flask with the aid of water, dilute to volume, mix and centrifuge if solution is cloudy. Pipet a 5.0 mL portion of the clear solution into a 100-ml volumetric flask, dilute to volume with water, and mix. Determine the absorbance of the 0.1% (w/v) solution in a 1-cm cell at 560 nm and that of the 1:20 (v/v) diluted solution at 280 nm with a suitable spectrophotometer previously standardized using water as reference. (A suitable spectrophotometer is one equipped with a monochromator to provide a bandwidth of 2 nm or less and of such quality that the stray-light characteristic is 0.5% or less.) Calculate the Absorbance Ratio by first multiplying the absorbance units at 280 nm by 20 (dilution factor) and by dividing the result of the multiplication by the absorbance units at 560 nm.

EBC Colour

EBC recommended method (European Brewery Convention, *Analytica*, 1987), whereby absorbance of light is measured at 430 nm in a 1 cm quartz cuvette, against water as the reference. The absorbance value measured is multiplied by an empirically derived factor of 25, to give a colour value in terms of EBC colour units. EBC=$A_{430}$×25.

EXAMPLES

Example 1

A light stabilizing composition according to the present invention was prepared from caramel (type D35 ex Devolder S.A.-N.V.) as follows: 20 gram liquid caramel (60-80% dry wt. solid) was dissolved in 200 mL distilled water and utrafiltered using a Millipore Amicon® series 8000 (model 8400, 400 mL) stirred cell, equipped with a Millipore® YM10 regenerated cellulose ultrafiltration membrane (10,000 nominal molecular weight limit, diameter: 76 mm, cat. no. 13642).

150 mL of filtrate was collected and applied to a 70 g, 5×6.5 cm C18-RP SPE bed (Supelco® LC-18 material) that had been conditioned with 50% (v/v) ethanol/water and percolated with 200 mL distilled water before usage. After elution of 150 mL distilled water was applied to the column and another 50 mL was collected. The collected fractions were freeze-dried before usage.

Example 2

An LC-PDA analysis was performed to identify the substances that are mainly responsible for the UV absorption characteristics of the light stabilising composition described in example 1.

Methodology:
  Waters Alliance® 2690 HPLC system with Waters® Diode array 996 detector, scanning between 210-400 nm, Millennium 32 software
  Prevail® Carboydrate ES (5 μm, 250×4.6 mm) column from Alltech® (cat no: 35101)
  Isocratic, 40 minute run-time, flow-rate 0.5 ml/min
  Solvents: 75% Acetonitrile (Sigma-Aldrich, cat no: 34998), 25% (v/v) aqueous solution of formic acid (Milli-Q plus water, adjusted to pH 3 with formic acid (98-100%), ACS reagent ex Riedel-de Haen)
  Sample temperature: 5° C.
  Column temperature: 25° C.
  Degassing: Continuous
  Samples prepared by 1:1 (v/v) dilution with acetonitrile and then filtered prior to analysis (PVDF 0.45 μM syringe filters)

Figure 1:
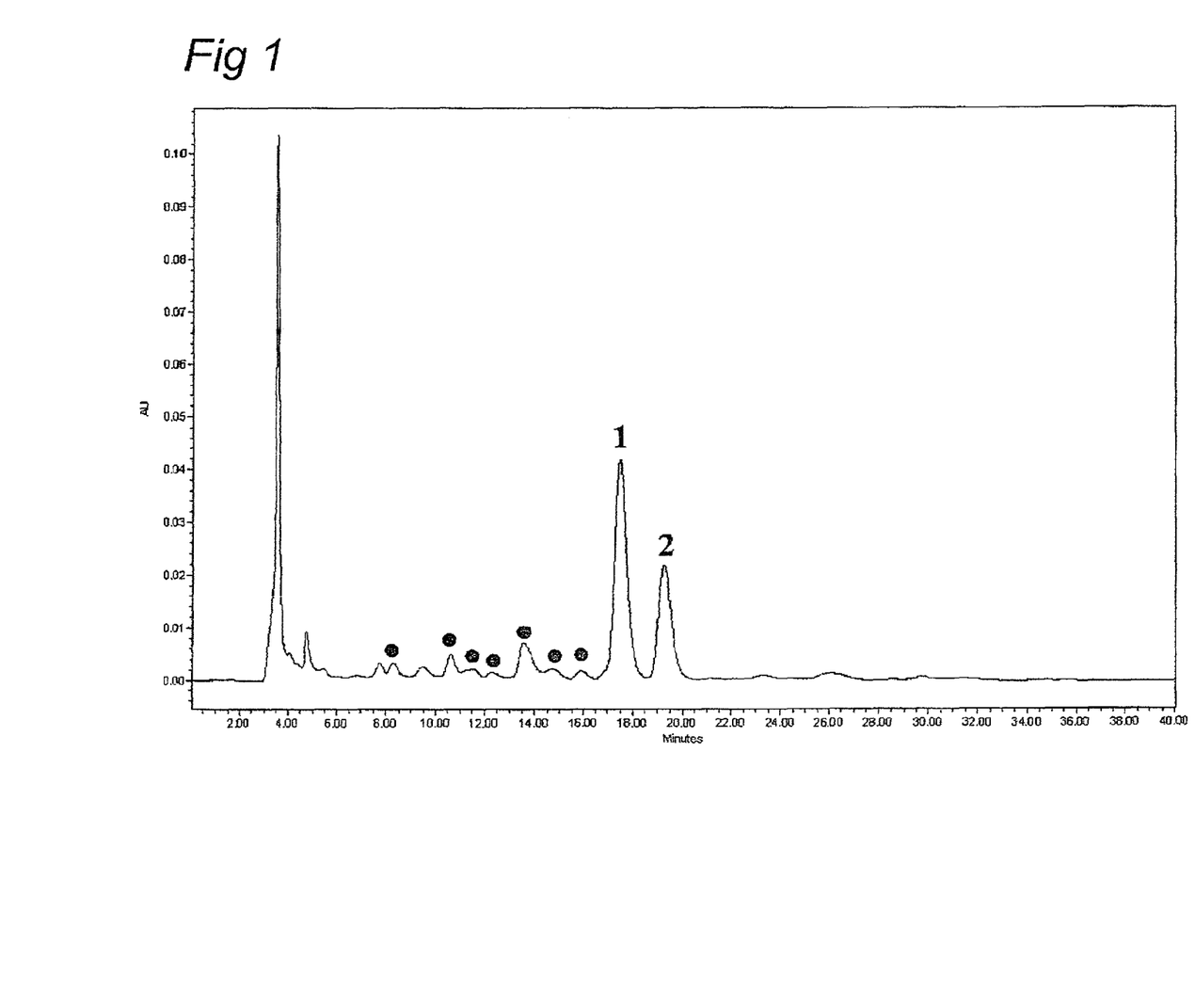
FIG. 1 is an LC-PDA (275 nm) UV absorption spectra of decolourised caramel, with denoted peaks: Compound 1: 2,6-deoxyfructosazine and 2: 2,5-deoxyfructosazine.

In order to determine the accurate masses of components 1 and 2, a decolourised caramel was injected onto an LC-electrospray-ToF-MS (positive mode) using an amino-based analytical column. A solution of 70 mg/L polyalanine in methanol was used as the lockmass (the internal calibrant). The elemental composition for both compounds was found to be $C_{12}H_{21}N_2O_7(=(M+H)^+)$. The results obtained are seen in FIG. 1.

Data 2,6-deoxyfructosazine 1-[6-(2,3,4-trihydroxy-butyl)-pyrazin-2-yl]-butane-1,2,3,4-tetraol:
  Mass found: 305.1353 Mass calculated: 305.1349
  Δmass: 1.3 ppm Data 2,5-deoxyfructosazine 1-[5-(2,3,4-trihydroxy-butyl)-pyrazin-2-yl]-butane-1,2,3,4-tetraol:
  Mass found: 305.1346 Mass calculated: 305.1349
  Δmass: −0.8 ppm

Example 3

The light stabilising properties of a caramel derived composition according to the invention were assessed by adding the light stabilising composition described in Example 1 to Heineken® pilsner (the Netherlands) in dosages of 0.5, 1.0 and 2.0 g/L (dry weight). The composition was added to freshly brewed beer, which was subsequently bottled in a 300 mL green glass bottle (Heineken® export, BSN or Rexam bottle 35.5 EB-5 GR). Bottling was performed in such a way that entrapment of atmospheric oxygen in the beer and headspace was minimised.

The bottles containing the light stabilising composition in the indicated amounts as well as a bottle with a control sample were exposed to simulated sunlight by a Xenon lamp (Atlas Material Testing Technology). The light dose was 2700 KJ/m² during 60 minutes. In addition, the samples containing 1.0 g/L of the stabilising composition were illuminated under the same conditions for 2, 8 and even 24 hrs.

The concentration of MBT in the samples can suitably be determined by means of the method described by Hughes et al. (Hughes P. S., Burke S. and Meacham A. E. (1997) "Aspects of the lightstruck character of beer". Institute of Brewing, Proceedings of the 6th Central and South Africa Section, pp. 123-128).

Figure 2:
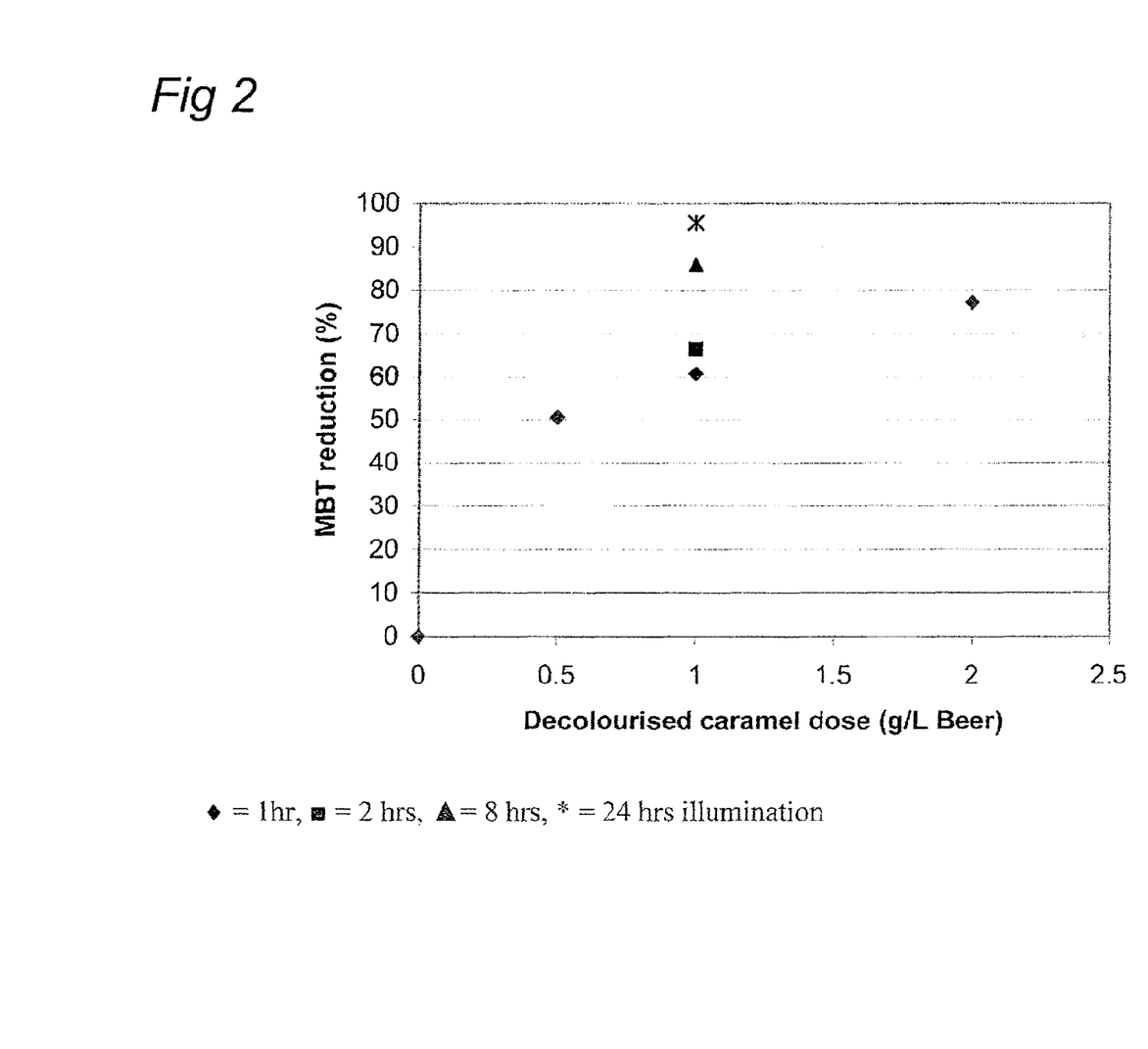
FIG. 2 is a graph which shows the MBT concentration (%) vs. decolourised caramel dose (g/L Beer)

Analyses of the aforementioned samples, as seen in FIG. 2, showed that the MBT concentration in the samples containing the light stabilizing composition was significantly lower than the MBT concentration found in the control sample:

The graph of FIG. 2 also shows that the effectiveness of the present light stabilizing composition increases with increasing exposure to light (see % reduction of 1.0 g/L sample as function of light exposure time).

The effect of the stabilising composition according to Example 1 on the colour of the aforementioned beer samples was determined by measuring the EBC colour value and the $A_{280/560}$ absorption ratio using the method described herein before. In addition, the same parameters were analysed for beer samples that contained the caramel starting material (original caramel) of Example 1 instead of the treated (decolourised) caramel. The following results were obtained:

| | Colour in EBC (430 nm). | | | |
|---|---|---|---|---|
| Dose (g/L) | Original caramel | Decolourised caramel | ΔEBC original caramel | ΔEBC decolourised caramel |
| 0 | 7.3 | 6.4* | — | — |
| 0.5 | 27.6 | 7.7 | 20.4 | 1.3 |
| 1 | 47.1 | 8.9 | 39.8 | 2.5 |
| 2 | 81.2 | 11.5 | 73.9 | 5.1 |

*Difference between undosed beers due to batch to batch difference.

| | $A_{280/560}$ absorption ratio | | | |
|---|---|---|---|---|
| | Original caramel | | Decolourised caramel | |
| Type caramel | $A_{280/560}$ | Colour intensity (610) | $A_{280/560}$ | Colour intensity (610) |
| A | 40 | 0.122 | 1941 | 0.002 |
| B | 38 | 0.083 | 1043 | 0.005 |
| C | 27 | 0.228 | 568 | 0.003 |

Caramel A: Caramel color No. 300 ex D. D. Williamson
Caramel B: Caramel color No. 310 ex D. D. Williamson
Caramel C: Type D35 ex Devolder S. A.-N. V.

Example 5

The absorption characteristics of the light stabilising composition described in Example 1 were compared with those of the two constituents (2,5- and 2,6-deoxyfructosazine) that were deemed to be largely responsible for the UV-absorption properties of said composition around 280 nm (see Example 2)

Samples were prepared as follows: An amount of material equivalent to 100 mg solids was transferred into a 100-ml volumetric flask with the aid of water, followed by dilution to volume, stirring and centrifuging if the solution is cloudy. Subsequently, a 5.0 mL portion of the clear solution is pipetted into a 100-ml volumetric flask, diluted to volume with water, and stirred.

The absorbance of the samples thus prepared was measured in a 1-cm quartz cell at 280 nm with a suitable spectrophotometer that was previously standardized using water as reference. A suitable spectrophotometer is one equipped with a monochromator to provide a bandwidth of 2 nm or less and of such quality that the stray-light characteristic is 0.5% or less.

Figure 3:
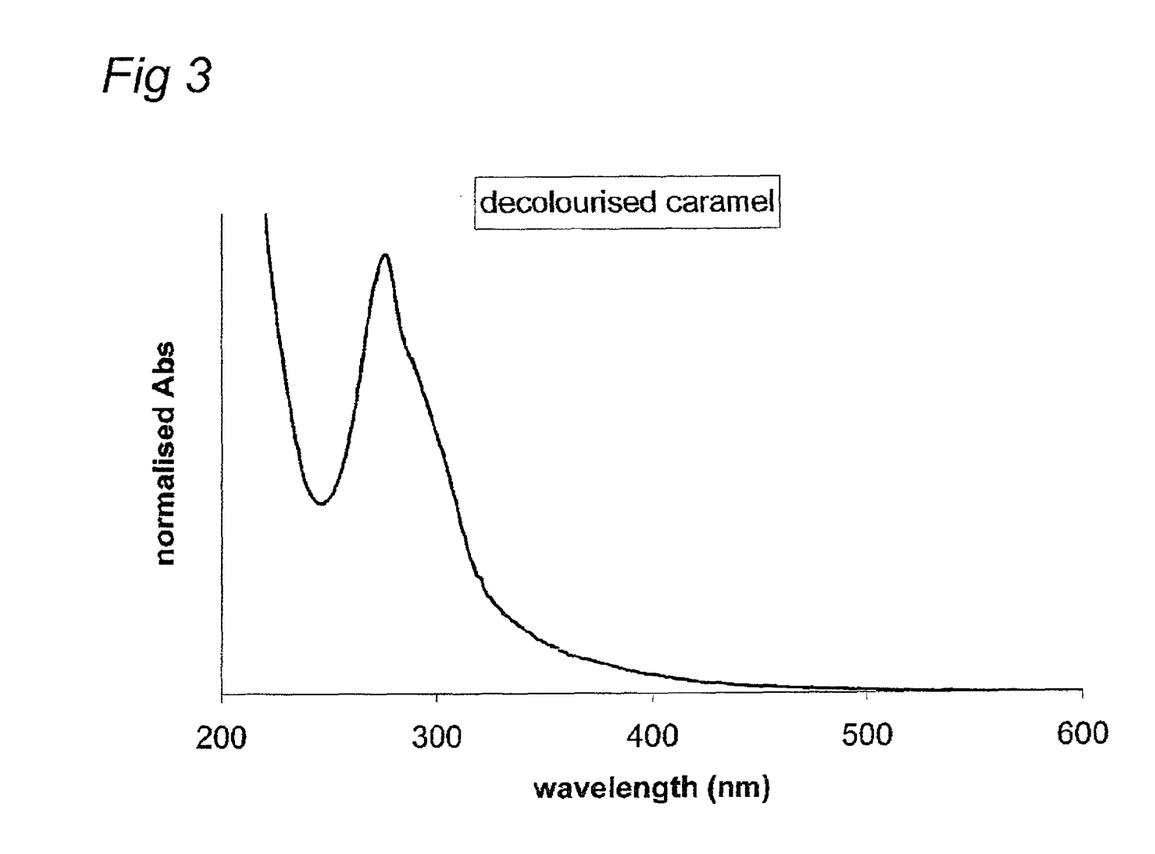
FIG. 3 is an absorption curve for decolourised caramel samples.
Figure 4:
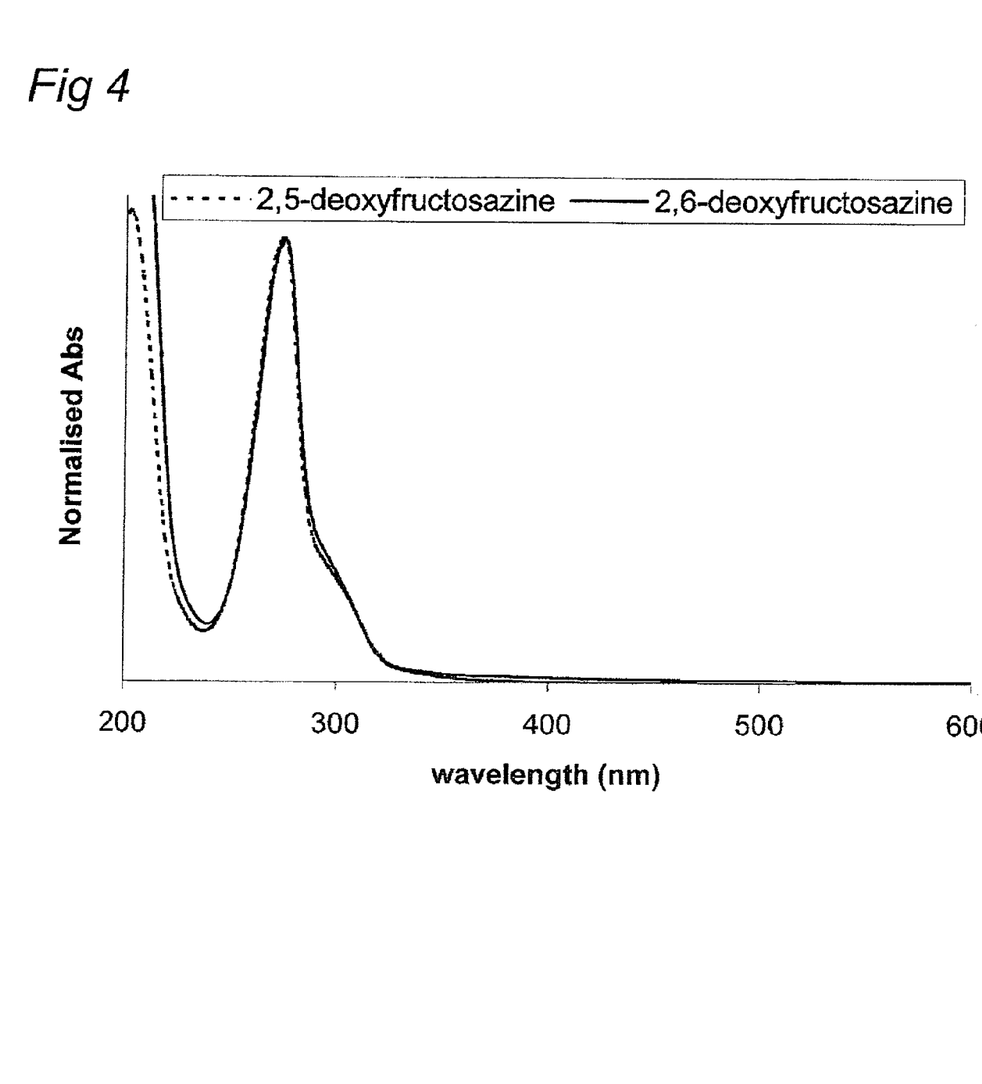
FIG. 4 is an absorption curve for 2,6-deoxyfructosazine and 2,5-deoxyfructosazine.

The adsorption curves for 2,6-deoxyfructosazine, 2,5-deoxyfructosazine, as seen in FIG. 4, decolourised caramel samples, as seen in FIG. 3, were determined as follows. The sprectra were normalised on the highest absorption in the 250-300 nm area (figures). From the results obtained in Example 2 and the UV absorption data it can be calculated that the aforementioned deoxyfructosazines account for about 40% of the UV absorption at 280 nm in this specific decolourised caramel.

Example 6

Milk is known to develop undesirable flavour changes when it is exposed to light, in particular sunlight. As a result of such exposure milk lipid oxidation products such as pentanal and hexanal, and dimethylsulphide are formed. Experiments were conducted to determine the effect of light stabilising compositions according to the invention on light induced off-flavour development in milk.

Three 14 mL milk samples were prepared in duplicate in 20 ML SPME (solid phase micro-extraction) vials (flat bottom (23 mm×75 mm) headspace vial with PTFE lined silicone closure (cat. no. 27199 and 27300) ex Supelco®) in a glove box under a carbon dioxide atmosphere and sealed tight.

Samples A and C: Milk without addition
Sample B: Milk containing 1 g/L of the light stabilising composition described in Example 1

Samples A were wrapped in aluminium foil and placed in a sunbox together with the other samples and illuminated for 30 minutes with the Xenon lamp used in Example 3. The light dose applied was 1350 kJ/m². Following illumination, the samples were analysed by SPME-GC-MS.

The results obtained show that all the milk samples contain dimethylsulphide. In both samples B and C the dimethylsulfide concentration had been reduced after illumination in comparison to samples A and a significant increase was observed in the concentration of dimethyldisulfide. The observed increase in dimethyldisulfide content of sample C was considerably higher than that of sample B. Dimethyldisulfide is a particularly foul smelling substance with an extremely high odour potency.

Example 7

Experiments were carried out to determine the light stabilising properties of fructosazines in beer.
MBT Reduction by Synthetic 2,5-deoxyfructosazine 2,5-deoxyfructosazine, synthesised from glucosamine, was dissolved in Heineken® lager beer (0.5 g/L) and illuminated for 12 min. in clear glass vials (40 mL (28×98 mm) with open-top screw cap (phenolic cap, PTFE/silicone septum), cat. no. 27089-U ex Supelco®). All samples were accompanied by the appropriate blanks. The samples were analysed on MBT formation. It was found that the addition of the synthetic 2,5-deoxyfructosazine in an amount of 0.5 g/L yielded a 70% reduction in MBT formation.
MBT Reduction by Isolated 2,6- and 2,5-deoxyfructosazines.

Both 2,6- and 2,5-deoxyfructosazine were isolated from fermented decolourised caramel by preparative liquid chromatography on a Waters® Delta 600 semi-preparative HPLC system with a Waters® Diode array 996 detector, scanning between 210-400 nm.

Column details: Prevail Carbohydrate ES (9 μm, 300×20 mm) column from Alltech® (cat no: 35215) Mobile phase composition: 75% Acetonitrile (Sigma-Aldrich®, cat no: 34998), 25% aqueous solution of formic acid (Milli-Q plus water, adjusted to pH 3.0 with formic acid (98-100%), ACS reagent ex Riedel-de Haën) running isocratic at a flow-rate of 10 ml/min (40 minutes run-time). Sample temperature: 25° C. Column temperature: 25° C.

The samples were prepared by 1:1 (v/v) dilution of the fermented decolourised caramel with acetonitrile followed by filtration (PVDF 0.45 μM syringe filters) prior to analysis. Fractions collected were subjected to solvent evaporation (rotary evaporator) and freeze-drying yielding a 7.5% fraction containing 2,6-deoxyfructosazine and a 4% fraction containing 2,5-deoxyfructosazine. The isolated fractions contained only very minor concentrations of contaminants.

Both isolates were dosed to Heineken® beer at 250 mg/L in clear glass vials and illuminated for 12 min. It was found that both products reduced MBT formation by about 60%.
MBT Reduction by Synthetic 2,5-fructosazine.

2,5-fructosazine ex Sigma-Aldrich was added to Heineken® beer at a concentration of 0.5 g/L. Samples in clear glass vials were illuminated for 12 min. The addition of the fructosazine was found to result in a reduction in MBT formation of about 70%.

Example 8

Cation Exchange material (Sigma-Aldrich, Dowex® 50WX4-400 strong cation exchange) was brought into the H⁺ form with a 1M aqueous HCl solution and thoroughly washed with distilled water until the washings were neutral. To 10 mL solutions containing 5 g of freeze dried decolourised caramel, prepared according to example 1, 0, 0.5, 1.0, 2.0 and 4 grams of the cation exchange material was added. These mixtures were shaken over night and filtered. The filtrate was freeze-dried and the dried solid material was added at 1 g/L to 300 g of Heineken beer in Heineken green bottles and illuminated for 60 min. The EBC colour value of the beer samples was determined as well as the reduction in MBT content versus the control sample, using the MBT analysis described in Example 3.

Figure 5:
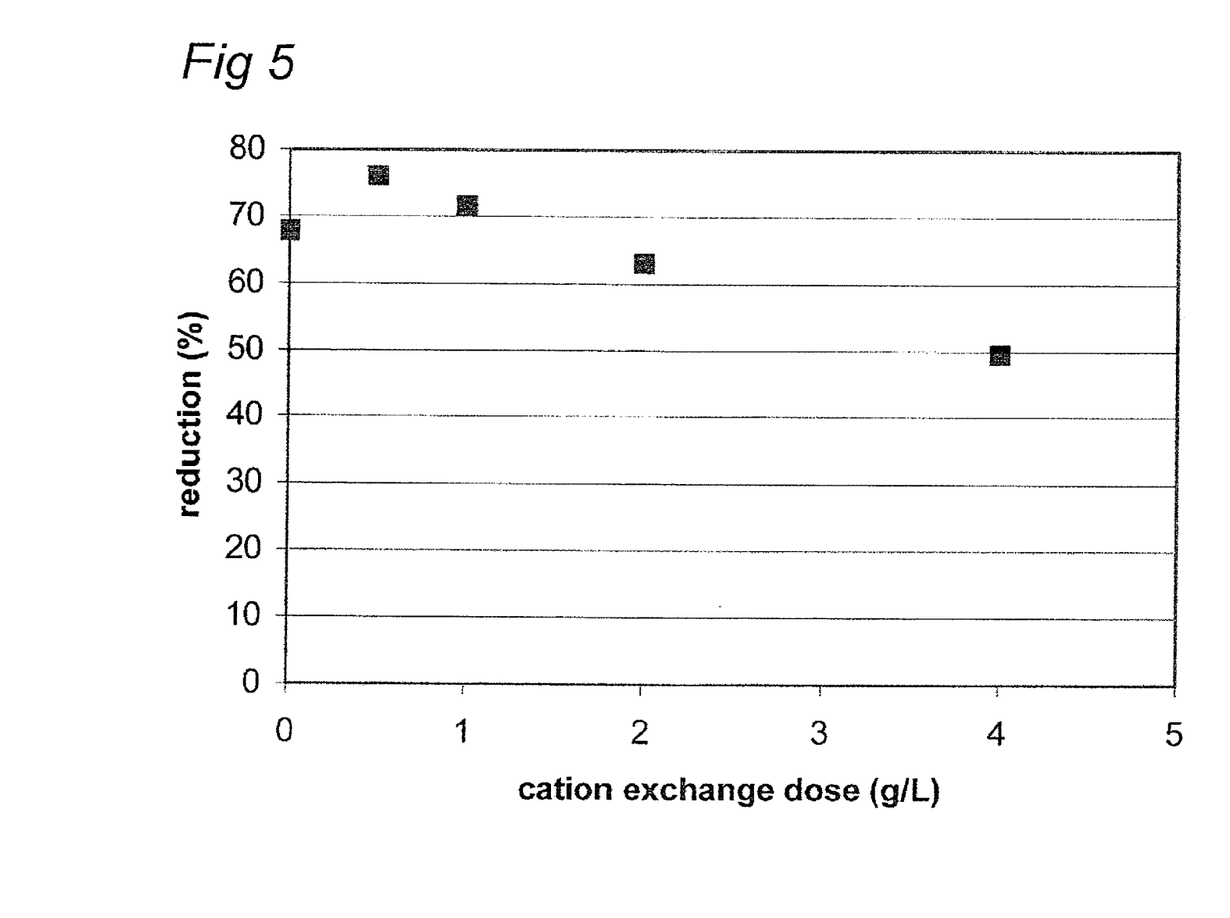
FIG. 5 is a graphical representation of cation exchange dose (g/L) vs. the reduction (%) in MBT content.
Figure 6:
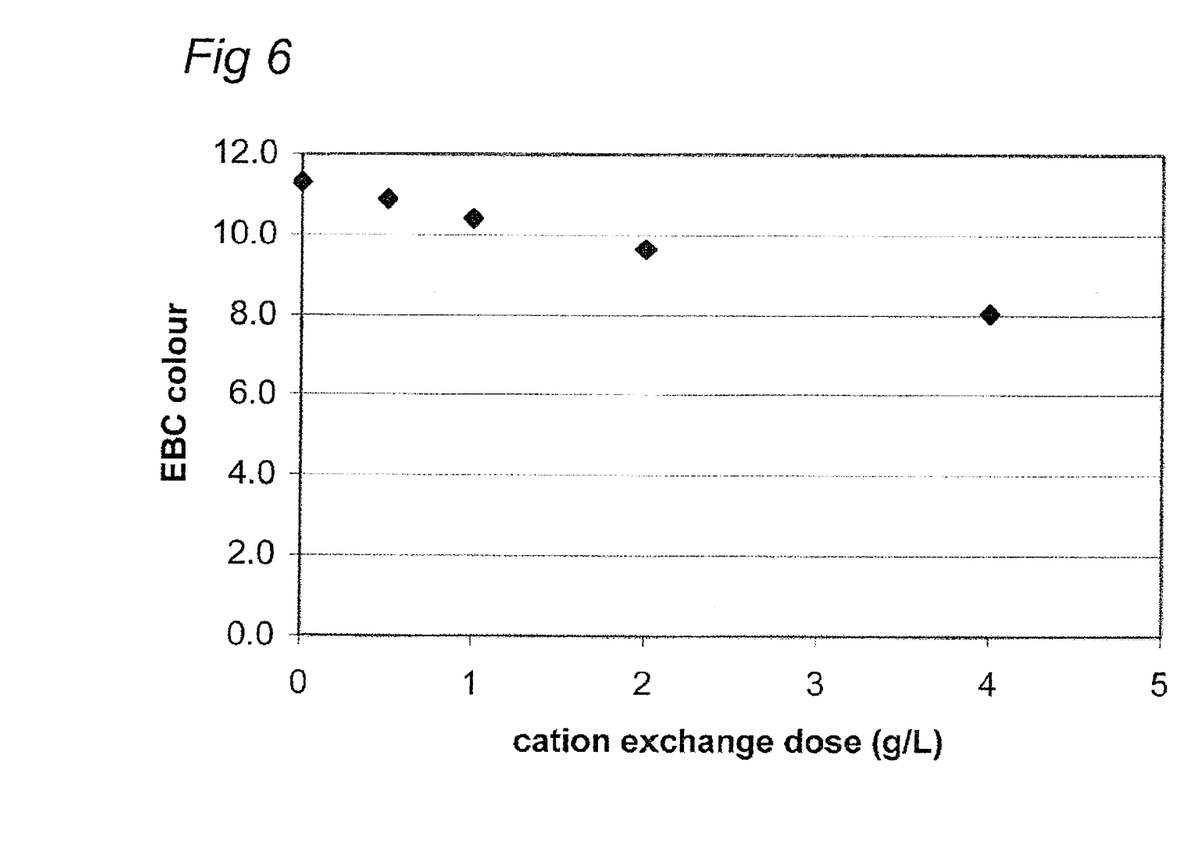
FIG. 6 is a graphical representation of cation exchange dose (g/L) vs. EBC colour value.

The results obtained are presented in the following graphs, namely, FIGS. 5 and 6.

These results illustrate that cation exchange material can be used to (further) decolourise caramel, while retaining a large part of the UV absorption capacity.

The invention claimed is:

1. A method of manufacturing a hop containing beverage that is resistant to light induced flavour changes, said method comprising introducing into said beverage a light stabilising composition containing at least 0.5% by weight of dry matter, of pyrazine derivatives according to formula (I):

wherein R1-R4 independently represent hydrogen; a hydroxyhydrocarbyl residue; an ester of a hydroxyhydrocarbyl residue; or an ether of a hydroxyhydrocarbyl residue, said hydroxyhydrocarbyl residue comprising 1-10 carbon atoms and comprising at least 2 hydroxyl groups; and at least one of $R_1$-$R_4$ is a hydroxyhydrocarbyl residue or an ester or an ether thereof; and wherein the light stabilising composition, if it contains caramelised material, exhibits an absorption ratio A280/560 of at least 80.

2. The method according to claim 1 comprising introducing into said beverage a light stabilizing composition containing at least 1.0%, by weight of dry matter, of the pyreazine derivatives.

3. The method according to claim 1, comprising introducing into said beverage a light stabilising composition that, if it contains caramelised material, exhibits an absorption ratio A280/560 of at least 250.

4. The method according to claim 1, wherein the hydroxyhydrocarbyl residue comprises 4 carbon atoms.

5. The method according to claim 1, wherein the hydroxyhydrocarbyl residue comprises three or four hydroxyl groups.

6. Method according to claim 1, wherein the pyrazine derivative contains at least two hydroxyhydrocarbyl residues.

7. Method according to claim 1, wherein the composition contains at least 0.1% of a fructosazine selected from the group consisting of 2,5-deoxyfructosazine, 2,6-deoxyfructosazine, 2,5-fructosazine, 2,6-fructosazine and combinations thereof, by weight of dry matter.

8. The method according to claim 7, wherein the composition contains at least 0.3%, of a fructosazine selected from the group consisting of 2,5-deoxyfructosazine, 2,6-deoxyfructosazine, 2,5-fructosazine, 2,6-fructosazine and combinations thereof, by weight of dry matter.

9. The method according to claim 1, wherein the light stabilising composition exhibits an $A_{280}$ that exceeds 0.01.

10. Method according to claim 9, wherein the light stabilising composition exhibits an $A_{280}$ that exceeds 0.05.

11. The method according to claim 1, wherein the composition exhibits an absorption ratio $A_{280/560}$ of at least 80.

12. Method according to claim 11, wherein the composition exhibits an absorption ratio $A_{250/560}$ of at least 250.

13. The method according to claim 1, wherein the composition is introduced into the beverage in an amount of between 0.01 and 1 wt. %, calculated on the basis of the amount of dry matter introduced.

14. Method according to claim 13, wherein the composition is introduced into the beverage or foodstuff in an amount of between 0.02 and 0.3 wt. %, calculated on the basis of the amount of dry matter introduced.

15. The method according to claim 1, wherein the composition is introduced into a bottled beverage.

16. Method according to claim 15, wherein the composition is introduced into a beverage bottled in green, clear or blue glass.

17. The method according to claim 1, wherein the composition is introduced in beer.

18. Method according to claim 17, wherein the composition is introduced in beer exhibiting an EBC colour value of less than 25.

19. Method according to claim 18, wherein the composition is introduced in beer exhibiting an EBC colour value of less than 15.

20. A hop containing beverage that is resistant to light induced flavour changes, wherein the beverage is obtained by the method according to claim 1.

21. A hop containing beverage that is resistant to light induced flavour changes, said beverage containing pyrazine derivatives derivatives according to formula (I):

I wherein $R_1$-$R_4$ independently represent hydrogen; a hydroxyhydrocarbyl residue; an ester of a hydroxyhydrocarbyl residue; or an ether of a hydroxyhydrocarbyl residue, said hydroxyhydrocarbyl residue comprising 1-10 carbon atoms and comprising at least 2 hydroxyl groups; and at least one of $R_1$-$R_4$ is a hydroxyhydrocarbyl residue or an ester or an ether thereof; and exhibiting an EBC colour value of less than 25, wherein the content of the pyrazine derivatives, expressed in mg/kg, exceeds 5×EBC colour value.

22. Beverage according to claim 21, exhibiting an EBC colour value of less than 15.

23. Beverage according to claim 21, wherein the hydroxyhydrocarbyl residue comprises 1-10 carbon atoms.

24. Beverage according to claim 21, wherein the hydroxyhydrocarbyl residue comprises at least two hydroxyl groups.

25. Beverage according to claim 21, wherein the pyrazine derivative contains at least two hydroxyhydrocarbyl residues.

26. Beverage according to claim 21, wherein the beverage contains at least 0.5 mg/kg of a fructosazine selected from the group consisting of 2,S-deoxyfructosazine, 2,6-deoxyfructosazine, 2,S-fructosazine, 2,6-fructosazine and combinations thereof.

27. Beverage according to claim 26, wherein the beverage contains at least 1 mg/kg of a fructosazine selected from the group consisting of 2,S-deoxyfructosazine, 2,6-deoxyfructosazine, 2,S-fructosazine, 2,6-fructosazine and combinations thereof.

28. Beverage according to claim 21, wherein the beverage contains at least 0.5 mg/kg of the pyrazine derivatives.

29. Beverage according to claim 28, wherein the beverage contains at least 1 mg/kg of the pyrazine derivatives.

30. Beverage according to claim 21, wherein said beverage is bottled in green, clear or blue glass.

* * * * *